June 21, 1966 F. V. WILKINS 3,257,596

TEMPERATURE-COMPENSATED TRANSISTOR AMPLIFIER AND SELF-SATURATING MAGNETIC AMPLIFIER AND MOTOR SPEED CONTROL SYSTEMS UTILIZING SAME

Filed Nov. 28, 1962 4 Sheets-Sheet 1

INVENTOR.
FLOYD V. WILKINS

BY
Curtis, Morris & Safford
ATTORNEYS

June 21, 1966 F. V. WILKINS 3,257,596

TEMPERATURE-COMPENSATED TRANSISTOR AMPLIFIER AND SELF-SATURATING MAGNETIC AMPLIFIER AND MOTOR SPEED CONTROL SYSTEMS UTILIZING SAME

Filed Nov. 28, 1962 4 Sheets-Sheet 2

INVENTOR.
FLOYD V. WILKINS

BY

Curtis, Morris & Safford

ATTORNEYS

June 21, 1966 F. V. WILKINS 3,257,596

TEMPERATURE-COMPENSATED TRANSISTOR AMPLIFIER AND SELF-SATURATING MAGNETIC AMPLIFIER AND MOTOR SPEED CONTROL SYSTEMS UTILIZING SAME

Filed Nov. 28, 1962 4 Sheets-Sheet 3

INVENTOR.
FLOYD V. WILKINS

BY
Curtis, Morris & Safford

ATTORNEYS

June 21, 1966 F. V. WILKINS 3,257,596

TEMPERATURE-COMPENSATED TRANSISTOR AMPLIFIER AND SELF-SATURATING MAGNETIC AMPLIFIER AND MOTOR SPEED CONTROL SYSTEMS UTILIZING SAME

Filed Nov. 28, 1962

4 Sheets-Sheet 4

INVENTOR.
FLOYD V. WILKINS
BY
Curtis, Morris & Safford
ATTORNEYS

United States Patent Office 3,257,596
Patented June 21, 1966

3,257,596

TEMPERATURE-COMPENSATED TRANSISTOR AMPLIFIER AND SELF-SATURATING MAGNETIC AMPLIFIER AND MOTOR SPEED CONTROL SYSTEMS UTILIZING SAME

Floyd V. Wilkins, Packanack Lake, N.J., assignor to Servo-Tek Products Co., Incorporated, Hawthorne, N.J., a corporation of New Jersey Filed Nov. 28, 1962, Ser. No. 240,504
12 Claims. (Cl. 318—327)

The present invention relates to temperature-compensated amplifiers and self-saturating magnetic amplifiers and to motor-speed control systems utilizing such amplifiers.

Among the many advantages of the temperature-compensated transistor amplifier described herein as illustrative of the present invention are those resulting from the fact that this amplifier is adapted to amplify direct-current signals with stability in spite of temperature changes. Moreover, this transistor amplifier includes only a few components and provides high gain with a high degree of stability over a wide range in temperature.

Among the many advantages of the self-saturating magnetic amplifier described herein as illustrative of the present invention are those resulting from the fact that this amplifier provides a high gain without oscillation and with stable operating characteristics in spite of changes in temperature, line voltage, frequency, or load-power output.

A motor-speed control system embodying the present invention enables the use of only a few transistor components and yet the system is stabilized against temperature changes over a wide range. The system is sensitive and accurate in its control response so that the motor quickly and accurately responds to changes in the control setting. Also, the system quickly responds to abrupt changes in load upon the motor so as to maintain the desired adjusted speed without hunting or fluctuations.

Among the many advantages of the magnetic-amplifier adjustable-speed motor control circuit described herein as illustrative of the present invention are those resulting from the fact that this motor-speed control system provides a wide range of speed adjustment and maintains a desired speed very closely over the entire range of adjustment in spite of changes in line voltage, frequency or temperature, as well as torque load. Moreover, the response to abrupt changes in load or in speed requirements is quick and accurate without significant overshoot. Consequently, a sudden change from no-load to full-load, or vice versa, does not induce oscillations in speed.

In addition this control system provides great power sensitivity in its control action. Thus, a small amount of control power is effective to control a relatively much greater amount of output power, and this is accomplished without complex circuitry involving large numbers of components. A high operating efficiency is provided, and the system does not require any "warm-up" period before it is placed in operation.

One of the major problems encountered in transistor amplifiers is the change in characteristics of the transistors with a change in temperature. This manifests itself as an increase in collector-emitter current with an increase in temperature. With a given forward bias (negative in the case of PNP types) the collector-emitter current will increase with temperature; and at the higher temperatures an appreciable current flow or "leakage" will take place without any forward bias. This "leakage" can then only be prevented by a bias of reverse polarity.

This temperature effect can be tolerated in many amplifiers handling alternating-current signal inputs since such temperature changes result only in a change in operating bias, which may still be within operating limits. However, in the case of amplifiers handling direct-current signals, such changes in current directly affect the output as an error current or voltage. For this reason, various types of mechanical and solid-state choppers are often used to convert or modulate D.-C. signals into A.-C. signals for amplification by transistor amplifiers. In many such cases the output signal is then demodulated by a similar synchronous device for conversion back into direct current.

Various other arrangements have been used to stabilize D.-C. amplifiers for direct amplification of D.-C. signals. Some of the arrangements that have been utilized include the use of two amplifier channels to create equal but opposite temperature effects. Such amplifiers usually make use of complementary-symmetry transistors. Other approaches to this problem have been by using complicated networks of negative feedback or some form of a bridge circuit utilizing temperature responsive components such as Thermistors, Stabistors, Sensistors, etc.

The transistor amplifier circuit herein described provides both voltage and current amplification of D.-C. signals of moderate level (millivolt range) with excellent temperature characteristics and yet uses low cost components in a circuit of extreme simplicity. As used herein the terms "direct-current signal" or "D.-C. signal" or similar term is intended to include signals having slowly varying or low-frequency components, i.e., up to ten cycles per second, as well as signals which remain constant over periods of several seconds or longer.

The various features, objects and advantages of the present invention will be in part pointed out and in part apparent from the following description considered together with the accompanying drawings which show a temperature-compensated transistor amplifier, a stabilized self-saturating magnetic amplifier and adjustable-speed motor control systems utilizing such amplifiers. The systems disclosed herein are not intended to be exhaustive nor limiting of the invention, but on the contrary is given for purposes of illustration in order that others skilled in the art may fully understand the invention and the manner of applying it in practical use under various conditions of application. In the drawings:

Figure 1:
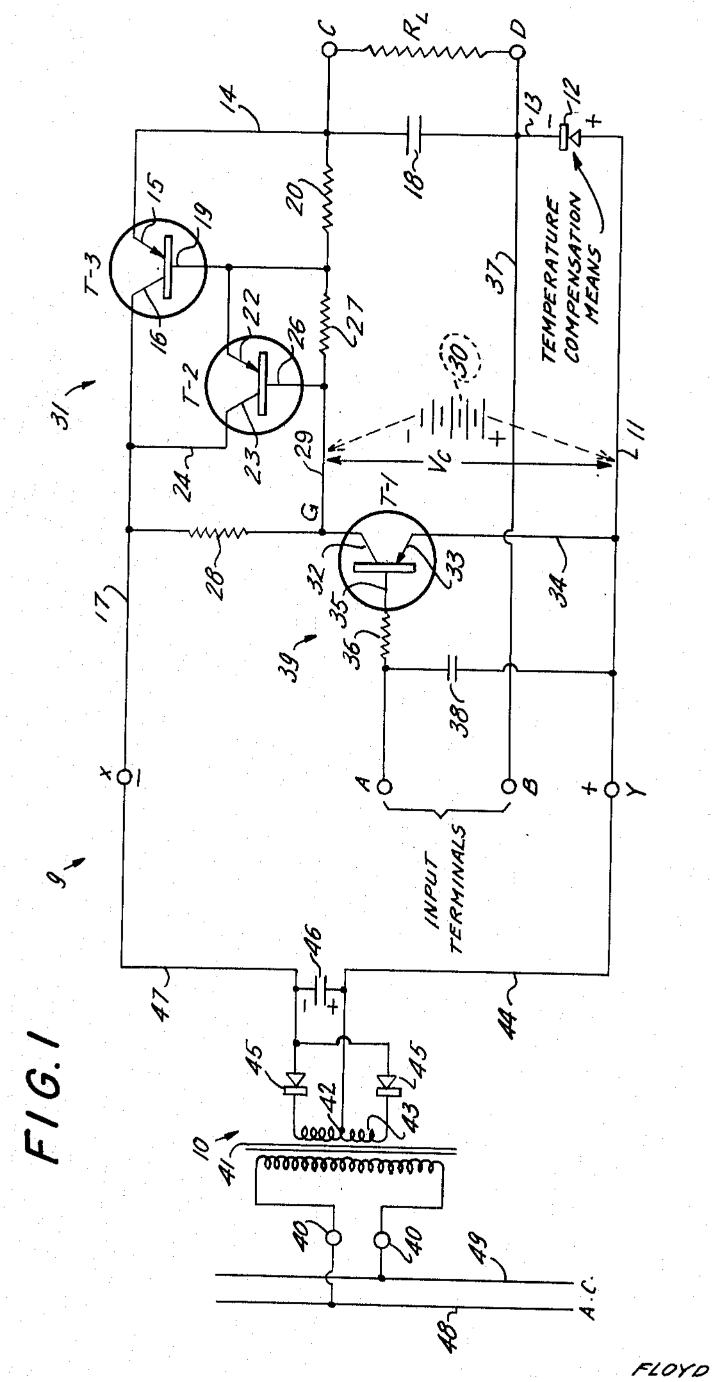
FIGURE 1 is a schematic circuit diagram of a temperature-compensated transistor amplifier adapted to amplify direct-current signals and which provides both voltage and current amplification.
Figure 1A:
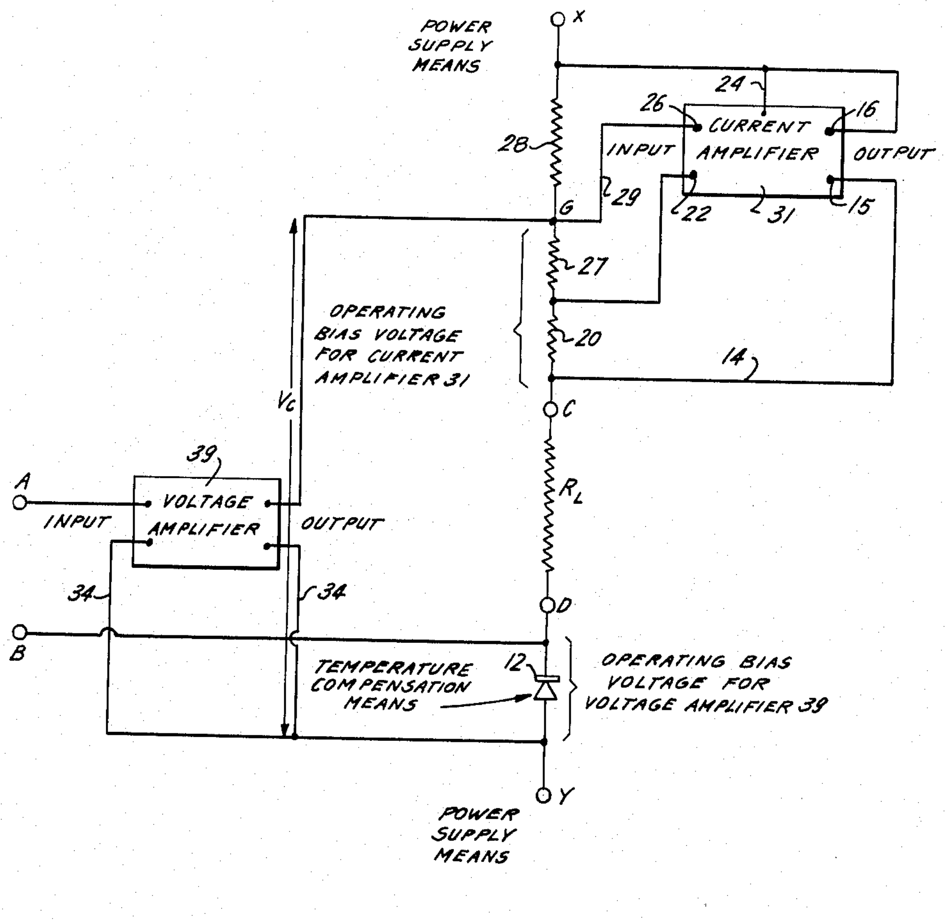
FIGURE 1A is an explanatory diagram for consideration in conjunction with FIGURE 1.

Referring to the drawings in greater detail, it is noted that the temperature-compensated transistor amplifier 9 shown in FIGURE 1 includes three transistors T–1, T–2 and T–3, for example shown as being of the PNP type, and the direct-current signal to be amplified is applied across a pair of input terminals A and B. The load circuit $R_L$ to which the amplified signal is to be supplied is connected between a pair of output terminals C and D. The load circuit is illustrated as a resistance component, and it may, for example, be a motor winding, a control winding, a meter winding, the coil of a galvanometer measuring instrument, or any winding or coil adapted to have a direct current signal applied theerto. A suitable source 10 of electrical power is connected to the energizing terminals X and Y of the amplifier, and is shown by way of example as a power supply for converting alternating current into rectified and filtered direct current at a desired voltage level applied to the terminals X and Y.

As will be explained, this amplifier 9 includes an amplification section 31 which provides a high current gain with a voltage gain of slightly less than unity. This current amplification section 31 comprises the transistors T–2 and T–3. This amplifier 9 also includes a voltage amplification section 39 which comprises the transistor T–1.

To explain the operation of this amplifier 9 it is noted that the transistor T–3 is in series with the load $R_L$ and with the electrical source 10. This series energization circuit for the load R can be traced from the positive supply terminal Y through a connection 11, through a temperature compensation diode 12 and a connection 13 to the output terminal D.

From the other output terminal C this series circuit continues through a connection 14 to the emitter 15 of the transistor T–3 and then from the collector 16 through a connection 17 to the negative supply terminal X. A capacitor 18 is shown as being shunted across the output terminals C and D, which may be desirable in certain types of load circuits, to filter out any transient voltage which might otherwise appear across these terminals.

In order to control the conduction through the transistor T–3, its base electrode 19 is connected through a resistor 20 to the lead 14 and is also connected to the emitter 22 of the transistor T–2. The collector 23 of the transistor T–2 has a connection 24 to the lead 17. Because the base 19 of the transistor T–3 is connected through the resistor 20 to its emitter 15, this transistor T–3 is normally deprived of forward bias voltage and hence is normally in its non-conducting state.

The transistor T–2 is also normally in a non-conducting state, for its base 26 is connected through a resistor 27 to its emitter 22. In other words, the transistor T–2 is turned off by resistor 27, which functions in the same manner as resistor 20 does in relation to transistor T–3.

To force the transistor T–3 into a conducting state, and thereby apply power to the load, the potential of its base connection 19 is caused to be more negative than its emitter 15. This negative potential is applied to the base 19 by placing the transistor T–2 into a conducting state, which in turn is caused by placing its base 26 at a negative potential with respect to its emitter 22. The potential of the base 26 is controlled by the relative distribution of voltage across a current-limiting resistor 28 and across the collector-to-emitter circuit of the transistor T–1. Thus, the operation of the two transistors T–2 and T–3 is controlled by the transistor T–1. The two transistors T–2 and T–3 provide a current amplification of high gain.

In order to explain further the operation of the portion of the circuit thus far described, it is convenient to imagine that there is a negative terminal of a battery or other source 30 of voltage applied to the connection 29 to the base 26 of the transistor T–2, with the positive terminal of this imaginary source 30 applied to the positive lead 11 from the main power supply 10. It is also assumed that this source 30 has a voltage which is less than the voltage available from the power supply 10. In this imaginary case, this negative potential 30 would force the transistors T–2 and T–3 into a conducting state and thus permit a current flow to the connected load $R_L$. However, the voltage drop across this connected load $R_L$ can never exceed this applied potential 30. If this were to happen, the emitters of the transistors T–2 and T–3 would be more negative than their bases thus causing reverse bias or cutoff condition. It will thus be seen that the load voltage always approaches that of the applied voltage 30. The load voltage can never exceed this applied voltage 30 and will be less than the applied voltage 30 only by an amount equal to the small collector-emitter drop of the transistors T–2 and T–3. From this explanation it can be understood that this arrangement provides an amplifier section 31 including T–2 and T–3 with a voltage gain of less than unity, but having a high current gain which is approximately equivalent to the product of the gains of the individual transistors T–2 and T–3.

The above-mentioned current gain in transistors T–2 and T–3 is accomplished with very little temperature effects. This avoidance of temperature effects is provided because any increased current flow through the transistors T–2 and T–3 would increase the voltage developed across the load $R_L$ but at the same time would be reducing the forward bias of the transistors T–2 and T–3. In extreme conditions this voltage across the load might further increase and would then even apply a reverse bias. This advantageous self-controlling action is responsible for reducing the temperature effects of this high-current-gain portion 31 of the amplifier to an insignificant level.

For most applications it is desirable to have both voltage amplification and current or power gain. In the amplifier circuit of FIGURE 1, this voltage amplification is supplied wholly by the amplifier section 39 which includes the transistor T–1. The collector 32 of the transistor T–1 is connected to the junction of the resistor 28 and the base 26 of transistor T–2.

It will now be understood that the resistor 28 serves a dual purpose. In one function it provides a current path to turn on the transistor T–2, and in addition it acts as the load resistor for the transistor T–1. The emitter 33 of transistor T–1 is connected by a lead 34 to the positive lead 11 from the power supply. The base 35 of transistor T–1 with a current limiting resistor 36 in series is connected to the input terminal A for the entire amplifier. The other amplifier input terminal B is connected by a lead 37 and through the diode 12 and through connections 11 and 34 to the emitter 33. In FIGURE 1 this diode 12 is connected in the positive power supply lead 11 in such a manner that the entire load current must pass through it. Condensers 38 and 18 serve as filters for any transients that might appear in the D.-C. signal input or in the output voltage.

If the amplifier input terminals A and B are connected to an input signal which places the base 35 at a more positive potential than the emitter 33 of transistor T–1, then there is only a very small current flow through the transistor T–1 and its associated load resistor 28. Under this condition the collector-emitter voltage of transistor T–1 will approximate that of the supply voltage from the source 10. This collector-emitter voltage of T–1 is called the control voltage $V_c$ for the amplifier section 31 and is analogous to the assumed voltage 30 mentioned in the preceding explanation, and hence under this condition the load $R_L$ will have almost the entire power supply voltage appearing across it.

However, if the input signal causes the base 35 of transisor T–1 to become more negative than the emitter 33, then the transistor T–1 will be in a conducting state, and the control voltage $V_c$ will be only that fraction of a volt which represents the saturation voltage of the transistor T–1. Because of the previously mentioned similar saturation voltage across transistor T–3 there will be only an extremely small no-signal voltage appearing at the output C–D. The transition from minimum to maximum amplifier output is accomplished entirely by the small amount of voltage and current required to go from a non-conducting to a conducting state of transistor T–1. The actual magnitude of this small amount of voltage and current in an amplifier as shown in FIGURE 1 depends upon circuit parameters and particularly upon transistor current gain specifications. However, in all cases this amplifier 9 advantageously requires only a very small input signal in the lower millivolt range and input currents in the lower microampere range.

The voltage amplification portion 39 of the amplifier of FIGURE 1 as presently described would be highly temperature sensitive because any change in collector-emitter current of the transistor T–1 would directly affect the output voltage. However, it was mentioned that the diode 12 is in series with the input terminal B and thus is effectively in the base-emitter signal path of transistor T–1. This diode 12 is also similarly affected by temperature so that the voltage drop across it becomes less with an increasing temperature. It will be noted that the polarity of this voltage across the diode 12 is such that the diode supplies a forward bias voltage for transistor T–1. The change of this forward bias with a change in temperature compensates the voltage portion of the amplifier of FIGURE 1 so that it is relatively immune to temperature changes. It will be understood by those skilled in the art of transistor circuits that the amplifier input can be supplied with a desired bias voltage that will locate the zero signal output at any desired operating point.

In practical applications this amplifier performs functions which have heretofore been considered by those skilled in the art to be impossible with an amplifier approaching the simplicity, reliability, and low cost of the one described.

In order to supply electrical power to the amplifier 9, a pair of terminals 40 of the primary winding of a step-down transformer 41 are connected to a suitable source of alternating current shown as being supplied from 60-cycle A.-C. power lines 48 and 49. A center-tap 42 on the secondary 43 is connected through a lead 44 to the positive supply terminal Y. The ends of the secondary 43 are connected through rectifiers 45 and across a power-filter capacitor 46 so as to supply full-wave rectified and filtered direct current to the amplifier. The negative supply terminal X is connected through a lead 47 to the filter capacitor and rectifiers.

Figure 2:
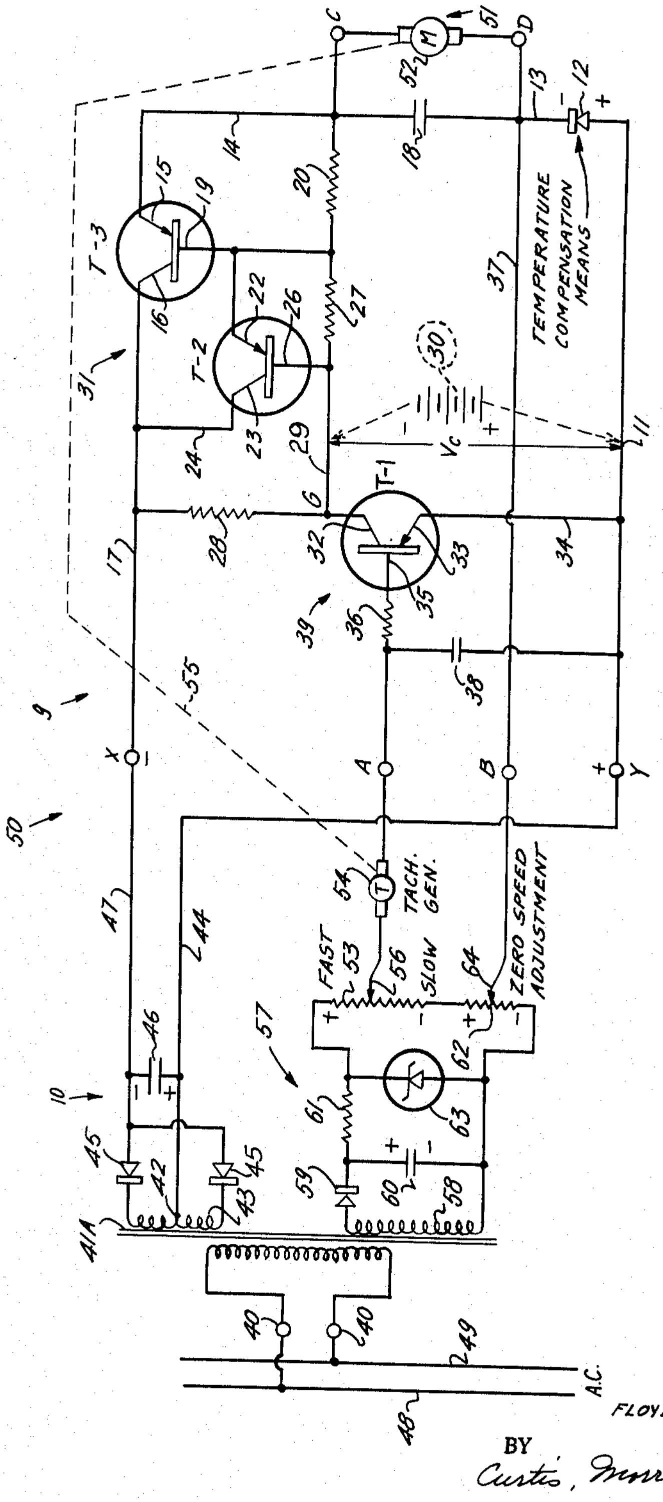
FIGURE 2 is a schematic circuit diagram of a motor-speed control system including the amplifier of FIGURE 1 and which operates as a D.-C. velocity servo system.

Reference is now made to the motor-speed control system 50 shown in FIGURE 2, which operates as a D.-C. velocity servo system. This system 50 utilizes an amplifier 9 as shown in FIGURE 1, and components in FIGURE 2 having functions corresponding with those in FIGURES 1 and 3 have corresponding reference numbers. A direct-current type of motor 51 of which the speed is to be controlled has its armature 52 connected to the amplifier output terminals C and D. This motor 51 may include any suitable field arrangement. For example, the magnetic field for the motor may be provided by a powerful permanent magnet, or the motor 51 may include a field winding which is separately energized as by a bridge rectifier connected to an alternating current source (such as the bridge rectifier and field winding arrangement shown in FIGURE 3), or the field winding may be in series with the armature between the terminals C and D.

The speed of the motor 51 is controlled in accordance with the magnitude of a reference voltage supplied between a contact point 56 and the terminal B. In the system shown the speed is controlled in accord with the setting of a speed-control potentiometer 53. The actual speed of the motor 51 is sensed by means of a tachometer generator 54 which is connected to the motor shaft through a suitable intervening mechanical linkage 55. If there is any difference between the desired speed of the motor as set by the control potentiometer 53 and its actual speed, then an error signal is applied across the pair of input terminals A and B of the transistor amplifier 9. The tachometer generator 54 is connected so that its polarity is applied to the amplifier input A–B in series opposition with the voltage appearing across the lower portion of the potentiometer 53 below the movable contact 56.

During operation, assume that the motor speed is below the desired level corresponding to the position of the movable contact 56 on the potentiometer 53, then this condition causes an error signal to be applied across the terminals A and B such that the terminal A is driven in the positive direction with respect to the terminal B. This error signal reduces tthe conduction through the emitter-to-collector (33–32) path of the transistor T–1 and hence increases the control voltage $V_c$ so that the current amplification section 31 supplies increased current to the motor 51. Thus, the motor is quickly brought up to the desired speed.

When the motor 1 is running faster than the desired speed, then the error signal causes the terminal A to be driven in a negative direction with respect to the terminal B. This error signal increases the conduction through the emitter-to-collector path of the transistor T–2 and so reduces the control voltage $V_c$ to reduce the current supplied to the motor. Consequently, the motor speed is quickly brought down to the desired value.

The power supply transformer 41A is similar to the transformer 41 of FIGURE 1 except that the transformer 41A includes an additional secondary winding 58 which is used to energize a reference voltage source 57. One end of this secondary 58 is connected through a diode rectifier 59 and across a filter capacitor 60 and through a filter resistor 61 to one end of the speed-control potentiometer 53. The other end of this secondary 58 is connected through a zero-speed adjustment setting potentiometer 62 to the opposite end of the control potentiometer 53. A Zener diode 63 is used to regulate the reference voltage source so as to hold constant the reference supply voltage being applied across the two potentiometers 53 and 62. A movable contact 64 on the zero-speed adjustment potentiometer is connected to the amplifier inpust terminal B. This contact 64 is initially adjusted to the desired setting for providing zero speed when the control contact 56 is at the slow speed end of the control potentiometer 53, and thereafter the contact 64 is left in its initial position, unless the operating conditions become changed so as to require re-setting of the zero speed point.

Figure 3:
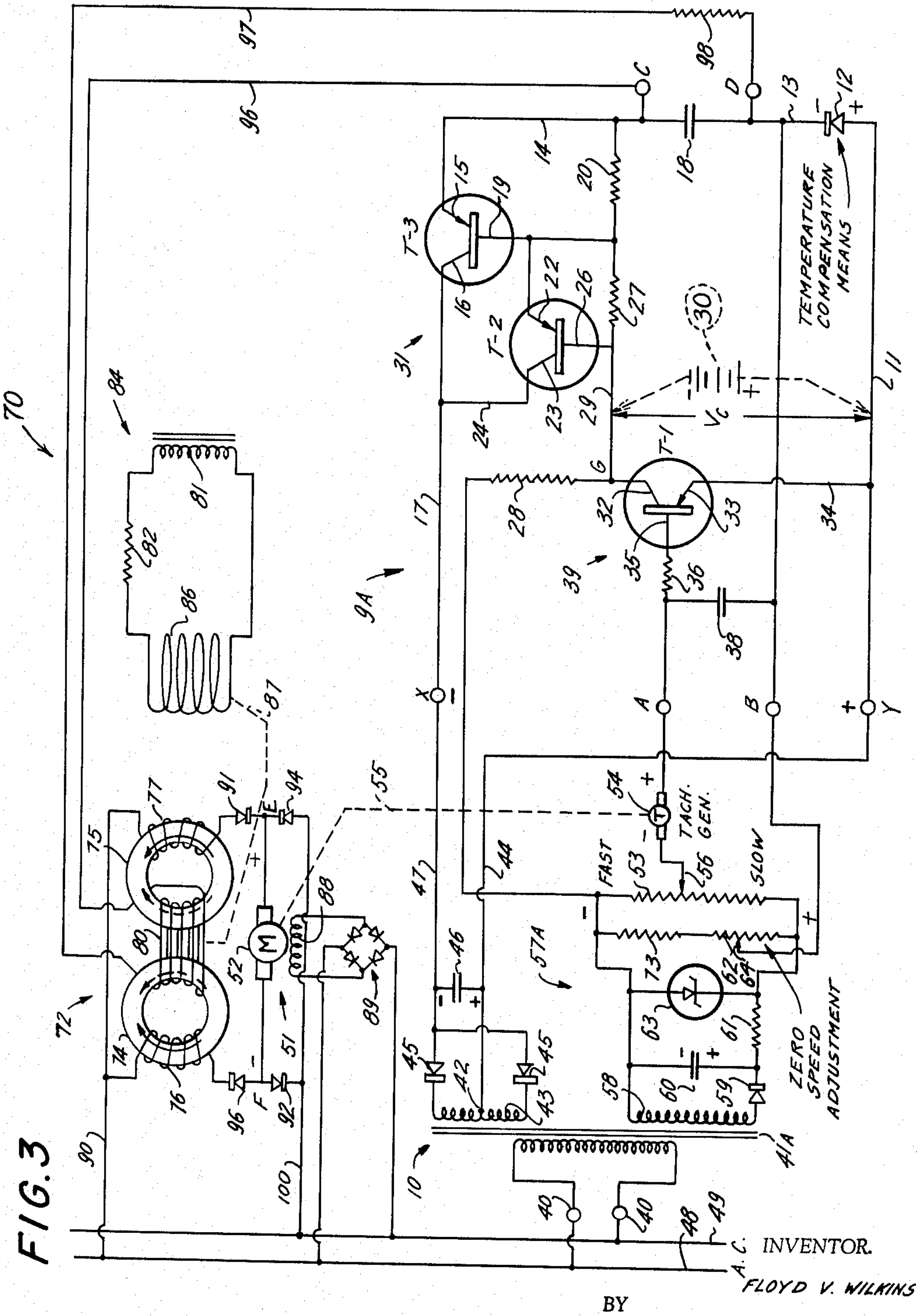
FIGURE 3 is a schematic circuit diagram of a motor-speed control system including the amplifier of FIGURE 1 and a self-saturating magnetic amplifier providing a high system gain without oscillation.

In the motor-speed control system 70 shown in FIGURE 3 is included a transistor amplifier 9A and a self-saturating magnetic amplifier 72, providing a high system gain without oscillation or other instability. This motor speed control 70 includes a reference voltage source 57A which is very similar to the reference source 57 of FIGURE 2, except that the polarity of this reference source 57A is reversed, for reasons as will be explained, and the zero-speed adjustment potentiometer 62 and a resistor 73 are in parallel circuit arrangement with the speed control potentiometer 53.

The amplifier 9A is very similar to the amplifier 9 of FIGURES 1 and 2 except that the upper end of the dual purpose resistor 28 is connected to the negative terminal R of the reference source 57A instead of being connected to the negative terminal X of the power supply 10. The reason for this change is that the reference source 57A provides a regulated voltage, and this connection of the resistor 28 to a well regulated source increases the stability of the over-all amplification in the system 70, which is desirable in view of the high system gain being provided. Another difference in the amplifier 9A is that the lower end of input capacitor 38 is connected to the connection 37 to the amplifier input terminal B, which in turn is connected to the zero-speed adjustment contact 64 in the reference supply 57A. Thus, the lower end of the capacitor 38 is also provided with a well regulated voltage from the reference source 57A.

In the magnetic amplifier 72 is a pair of cores 74 and 75 of ferromagnetic material of a type having a hysteresis curve which is generally rectangular in configuration. That is, the plot of core flux per unit of area of core cross section as a function of applied magnetomotive force (M.M.F.) abruptly rises to the saturation level when the applied M.M.F. exceeds a predetermined value. Moreover, the core retains most of the resultant flux when the M.M.F. is removed. This type of "rectangular loop" magnetic core material can be obtained commercially as an iron-silicon alloy under the trademarks "Magnesil" and "Silectron" and as an iron-nickel alloy under the trademarks "Orthonol" and "Deltamax."

These cores 74 and 75 are identical, and they may have any suitable shape for providing an opening with a closed flux path in each core pass around the opening. However, to provide an efficient utilization of the magnetic material, it is an advantage to use toroidal cores which are identically made and have their grain structure oriented in the direction of the flux path passing around the opening. To provide the grain orientation which is desired these toroidal cores 74 and 75 are fabricated by winding many turns of a thin strip of core stock into a toroidal form.

Each core 74 and 75 contains a controlled winding 76 and 77 often called a "gate" winding, and these two gate windings are wound in opposite sense on their respective cores. Thus, a current flowing down through the gate winding 76 tends to induce magnetic flux in a clockwise direction in core 74 as indicated by the curved arrow, whereas the gate winding 77 is arranged to have the opposite effect.

The amount of current which actually flows through the gate windings 76 and 77 during respective half-cycles of the A.-C. power is controlled by the operation of a main control winding 80 as modified by the control action of an inductor 81 in series with a resistor 82 in a stabilization circuit 84, as will be explained further below. As illustrated the main control winding 80 is wound through both of the cores 74 and 75. This main control winding 80 has the effect of tending to saturate each core 74 and 75 initially in the opposite direction from the action of the gate windings 76 and 77.

In this example of the invention the inductor 81 and resistor 82 are connected to a secondary winding 86 which is wound through the openings of both cores 74 and 75. It will be understood that the winding 86 is wound through both cores in a manner similar to the main control winding 80 as is indicated by the dashed line 87, and this winding 86 is drawn in the position as shown for purposes of clarity of illustration and explanation.

A direct-current type of motor 51 of which the speed is to be controlled has its armature 52 connected to the output terminals E and F of the magnetic amplifier 72. This motor 51 may be any suitable type of D.-C. motor, except that it is a much more powerful motor than the motor in FIGURE 2. In this illustrative system 70 the motor 51 has a field winding 88, which is separately energized by means of a bridge rectifier 89 connected to the A.-C. power lines 48 and 49.

In the operation of the self-saturating magnetic amplifier 72 during the half-cycle when the A.-C. line 48 is positive relative to the line 49, current tends to flow in a circuit which is traced through the input connection 90, the gate winding 77 and through a rectifier 91 to the terminal E connected to the motor armature 52. This circuit continues through the armature and the other terminal F and through another rectifier 92 to the other input connection 100. During the other half-cycle when the A.-C. line 49 is relatively positive, then current tends to flow in a similar circuit through the connection 100, a rectifier 94 and the terminal E to the motor armature. This circuit is completed through the terminal F, a rectifier 95 and the gate winding 76 to the connection 90. The rectifiers 91, 92, 94 and 95 are silicon diode rectifiers. The magnetic amplifier 72 tends to saturate itself by current flow through its gate windings 76 and 77 and hence is called a "self-saturating" type.

It is noted that any current flow through the motor armature 52 is always in the direction from the terminal E to the terminal F as indicated by "+" and "−."

The amount of current flow through the motor, that is, the amount of power being delivered to the motor is controlled by the main control winding 80, by its effective M.M.F. applied to the cores 74 and 75. When there is insignificant effective M.M.F. being applied by the control winding 80, then the cores 74 and 75 become saturated early during each half-cycle by the current tending to flow through the gate windings 76 and 77. Consequently, the impedance of the gate windings becomes low early in each half-cycle (the gate has been "opened" early), and so a large amount of power is permitted to flow to the motor.

Conversely, when there is a substantial current flowing in the control winding 80 so that its effective M.M.F. applied to the cores 74 and 75 is significant, then the impedance presented by the gate windings 76 and 77 remains substantial for a longer period during each half-cycle. Thus, the gate is opened later in each half-cycle, and so less power is delivered to the motor 51. In effect, current in the control winding 80 presets the saturation level of the cores in the opposite direction from the direction of saturation caused by the respective gate windings, and so it resists early saturation of the cores 74 and 75 by the gate windings, and so it delays the opening of the gate until later in each half-cycle. When the control current is sufficiently large it presets the saturation level of the cores to such a high value that the respective gate windings are not able to reverse the saturation of the cores in their direction and so a large control current maintains a high impedance in the gate windings so as to shut off the flow of power to the motor 51.

From the foregoing explanation it will be understood that the reason for utilizing the polarity of the reference source 57A as shown (which is reversed from the source 57 in FIGURE 2) is that a minimum flow of power from the transistor amplifier output terminals C and D through the connections 96 and 97 to the control winding 80 serves to shut off the motor 51. Conversely, minimum power output from the terminals C and D serves to supply full power to the motor. A filter resistor 98 cooperates with the transistor amplifier output filter capacitor 18.

The polarity of the tachometer generator 54 is such as to oppose the voltage in the portion of the speed control potentiometer 53 below the adjustable contact 56. Hence, this tachometer generator 54 in the system 70 is reversed in polarity from the one shown in the system 50 of FIGURE 2.

In a motor-speed control system as described in connection with FIGURE 2 power gains are realized up to one million, that is, by comparing the input control power with the output power supplied to the motor. In a motor-speed control system as described in connection with FIGURE 3 when operating a one-horsepower motor, power gains in excess of one billion are provided.

Moreover, in FIGURES 2 and 3 instead of controlling the system 50 or 70 by means of the setting of the contact 56, the negative terminal of the tachometer generator 54 can be disconnected from the contact 56 and the terminal B can be disconnected from the contact 64, and then the speed of the motor can be controlled by any suitable D.-C. signal from an external source applied between the terminal B and the negative tachometer terminal. Then the motor 51 operates as a slave to this control signal from the external source.

The purpose of the inductor 81 in series with the resistor 82 is to oppose any rapid changes in the current in the control winding 80 and to provide a circuit time constant for preventing "hunting" of the motor, i.e., fluctuations or oscillations of the motor speed above and below the desired value. The auxiliary winding 86 is coupled to both cores 74 and 75, and changes in the current through the control winding 80 affect both cores in the same way as indicated by the dotted arrows. Thus, with respect to sudden changes in current through the main control winding 80, the auxiliary winding 86 acts as a secondary winding and has current flow induced therein which passes through the inductor 81 and resistor 82. Consequently, the inductor and resistor oppose and damp out any such sudden changes in control current and so prevent instability.

It will be understood that the auxiliary winding 86 does not couple to the individual gate windings in this manner and does not prevent them from quickly reducing their impedance as described further above.

An advantages of the adjustable motor speed control system 70 is the temperature stability and reliability of the control system over a range of temperature from −25° C. to +50° C.

From the foregoing it will be understood that the temperature-compensated transistor amplifier and self-saturating magnetic amplifier and motor speed control systems including these amplifiers embodying the present invention as described above is well suited to provide the advantages set forth, and since many possible embodiments may be made of the various features of this invention and as the system herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention.

What is claimed is:

1. A transistor amplifier, said amplifier comprising, in combination, voltage amplification means comprising a common emitter-collector-connected transistor voltage amplifier having a voltage gain substantially greater than unity, current amplification means comprising a common base-connected transistor amplifier having a current gain substantially greater than unity, means for conducting the amplified voltage signal produced by said voltage amplification means and applying said voltage signal to the input of said current amplification means, a load circuit connected in series with said current amplification means, input means for receiving an input signal and conducting said input signal to said voltage amplification means, a temperature-sensitive element connected to said input means and said voltage amplifier to compensate for voltage amplification changes in said voltage amplifier caused by amplifier operating temperature changes, and bias means for said current amplification means, said bias means comprising impedance means connected to said load circuit so as to develop a bias voltage proportional to the current flowing through said load circuit and connected to said current amplification means so as to apply said bias voltage so as to vary the current gain of said current amplification means in a sense such as to compensate for amplification variations caused by amplifier operating temperature changes.

2. Apparatus as in claim 1 in which said amplified voltage signal is applied to said input of said current amplification means in a sense such that an increase in said amplified voltage signal produces a reduction of the forward bias on said transistor amplifier of said current amplification means.

3. Apparatus as in claim 1 in which said bias impedance means comprises a resistor connected to the base electrode of a transistor in said current amplification means and to said load circuit.

4. Apparatus as in claim 3 in which said temperature-sensitive element is a temperature-sensitive diode connected in series with said load circuit.

5. High-gain transistor amplifier means with temperature compensation, said amplifier means comprising, in combination, a first transistor having first base, collector and emitter electrodes, a second transistor having second base, collector and emitter electrodes, power supply terminals, a load impedance connected in series with the emitter-collector path of said second transistor, the series combination so formed being connected between said power supply terminals, a first resistor connected in series with the collector-emitter path of said first transistor with the series combination so formed being connected between said power supply terminals, input circuit means connected to said first base electrode and one of said first emitter and collector electrodes for conducting an input signal to said first transistor, said input circuit means including a temperature-sensitive circuit element connected so as to compensate for change in operating characteristics of said first transistor due to operating temperature changes, said first resistor being connected to said second transistor so as to apply the amplified voltage developed across it to bias said second trasistor, and a second resistor connected to the common point between said second transistor and said load impedance and to said base electrode of said second transistor for providing temperature-compensating bias for said second transistor.

6. Apparatus as in claim 5 including a third transistor having third base, collector and emitter electrodes with said first resistor connected between said third base electrode and the emitter-collector path of said third transistor, said emitter-collector path of said third transistor being connected to the base electrode of said second transistor, and a third resistor connected between the base electrodes of said second and third transistors.

7. Apparatus as in claim 6 in which said temperature-sensitive circuit element is a temperature-sensitive diode connected in series with said load impedance.

8. Direct current motor speed control means comprising, in combination, a direct current motor, a source of reference voltage, a tachometer driven by said motor and connected in series opposition to said reference voltage source to produce a correction signal which is the algebraic summation of the output signals of said tachometer and said reference voltage source, voltage amplification means comprising a common emitter-collector-connected transistor voltage amplifier having a voltage gain substantially greater than unity, current amplification means comprising a common base-connected transistor amplifier having a current gain substantially greater than unity, means for conducting the amplified voltage signal produced by said voltage amplification means and applying said voltage signal to the input of said current amplification means, said motor being connected to said current amplification means, input means for conducting said correction signal to said voltage amplification means, temperature correction means connected to said input means to compensate for voltage amplification changes in said voltage amplifier caused by amplifier operating temperature changes, and bias means for said current amplification means, said bias means comprising impedance means connected to said motor so as to develop a bias voltage proportional to the current flowing through said motor and connected to said current amplification means so as to apply said bias voltage so as to vary the current gain of said current amplification means in a sense such as to compensate for amplification variations caused by amplifier operating temperature changes.

9. Apparatus as in claim 8 including a magnetic amplifier having at least one saturable magnetic core and control winding means connected in series between said current amplification means and said motor.

10. Apparatus as in claim 9 including stabilization winding means for said magnetic amplification means, said stabilization winding means comprising a winding on said core and an inductor connected in series with said winding.

11. Direct current motor speed control means comprising, in combination, a direct current motor, a source of reference voltage, a tachometer driven by said motor and connected in series opposition to said reference voltage source to produce a correction signal which is the algebraic summation of the output signals of said tachometer and said reference voltage source, a first transistor having first base, collector and emitter electrodes, a second transistor having second base, collector and emitter electrodes, power supply terminals, said motor being connected in series with a load impedance connected in series with the emitter-collector path of said second transistor, the series combination so formed being connected between said power supply terminals, a first resistor connected in series with the collector-emitter path of said first transistor with the series combination so formed being connected between said power supply terminals, input circuit means connected to said first base electrode and one of said first emitter and collector electrodes for conducting an input signal to said first transistor, said correction signal to said first transistor, said input circuit means including a temperature-sensitive circuit element connected so as to compensate for changes in operating characteristics of said first transistor due to operating temperature changes, said first resistor being connected to said second transistor so as to apply the amplified voltage developed across it to bias said second transistor, and a second resistor connected to the common point between said second transistor and said motor and to said base electrode of said second transistor for providing temperature-compensating bias for said second transistor.

12. Apparatus as in claim 11 including a third transistor having third base, collector and emitter electrodes with said first resistor connected between said third base electrode and the emitter-collector path of said third transistor, said emitter-collector path of said third transistor being connected to the base electrode of said second transistor, and a third resistor connected between the base electrodes of said second and third transistors.

References Cited by the Examiner

UNITED STATES PATENTS

| | | | |
|---|---|---|---|
| 2,751,550 | 6/1956 | Chase | 323—68 X |
| 2,839,620 | 6/1958 | Waldhaner | 330—23 |
| 2,881,269 | 4/1959 | Hanel et al. | 330—23 |
| 2,975,260 | 3/1961 | Carlson | 323—68 X |
| 3,025,451 | 3/1962 | Hakimoglu | 323—66 X |
| 3,026,463 | 3/1962 | Wolke et al. | 318—327 |
| 3,026,464 | 3/1962 | Greening et al. | 318—327 |
| 3,030,570 | 4/1962 | Perkins | 323—89 |
| 3,037,157 | 5/1962 | Young | 318—327 X |
| 3,040,242 | 6/1962 | Perkins | 323—89 |
| 3,050,644 | 8/1962 | Ironside | 307—88.5 |
| 3,081,426 | 3/1963 | Bakke | 323—66 X |
| 3,131,342 | 4/1964 | Wilkerson | 307—88.5 |

MILTON O. HIRSCHFIELD, *Primary Examiner.*

ORIS L. RADER, *Examiner.*

S. GORDON, *Assistant Examiner.*